United States Patent [11] 3,625,472

[72] Inventor Frank J. Rychlik
 Northbrook, Ill.
[21] Appl. No. 859,374
[22] Filed Sept. 19, 1969
[45] Patented Dec. 7, 1971
[73] Assignee Illinois Tool Works, Inc.
 Chicago, Ill.

[54] ROLLER CLAMP FOR FLEXIBLE TUBING
 12 Claims, 19 Drawing Figs.
[52] U.S. Cl............................................. 251/6,
 24/126 B
[51] Int. Cl....................................... F16k 7/06
[50] Field of Search............................ 24/126 B,
 136 A, 263 SW, 263 DP, 171, 244; 251/4, 6, 9, 10;
 211/66

[56] References Cited
 UNITED STATES PATENTS
1,139,595 5/1915 Starr............................... 24/244
2,349,114 5/1944 Russell........................... 24/136 A
2,412,097 12/1946 Russell........................... 24/136 A
3,099,429 7/1963 Broman.......................... 251/6
3,189,038 6/1965 Von Pechmann............. 251/6 X

*Primary Examiner*—M. Cary Nelson
*Assistant Examiner*—Richard Gerard
*Attorneys*—Robert W. Beart, Michael Kovac, Barry L. Clark and Jack R. Halvorsen ABSTRACT: A variable clamp device for controlling fluid flow through resilient tubing. The clamp includes a body having a reference surface, a rigid roller maintained by resilient pressure in intimate contact against the reference surface and a channel having a varying depth relative to the axial extent of the reference surface for accepting the tubing with the roller acting on the tubing as the roller moves along the reference surface to compress the tubing within the channel.

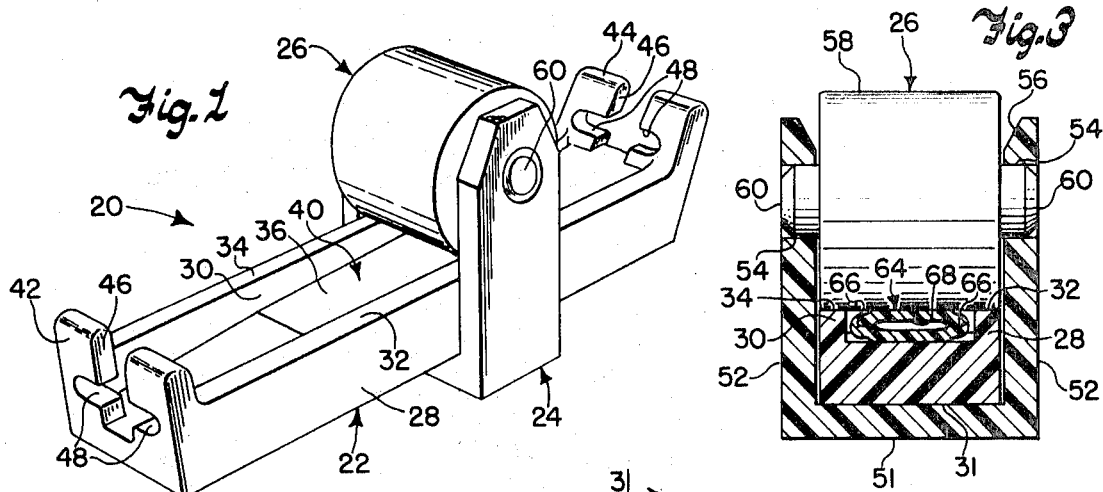

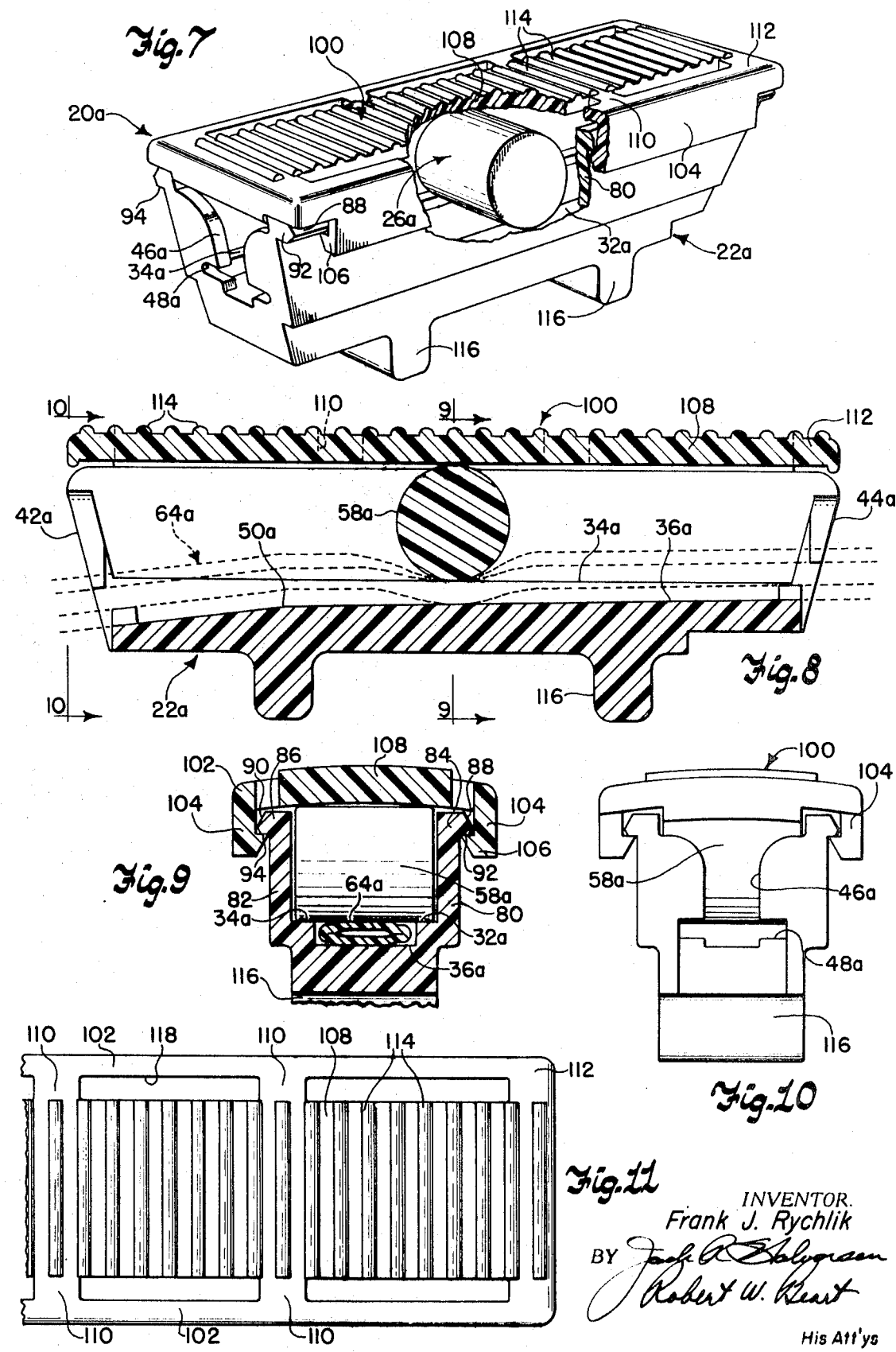

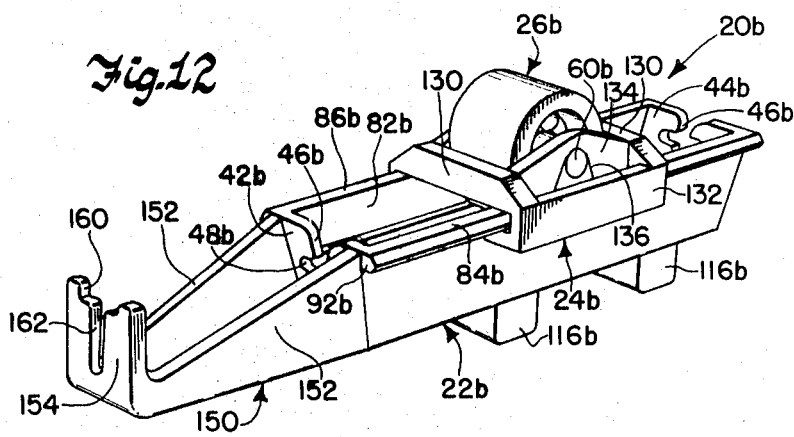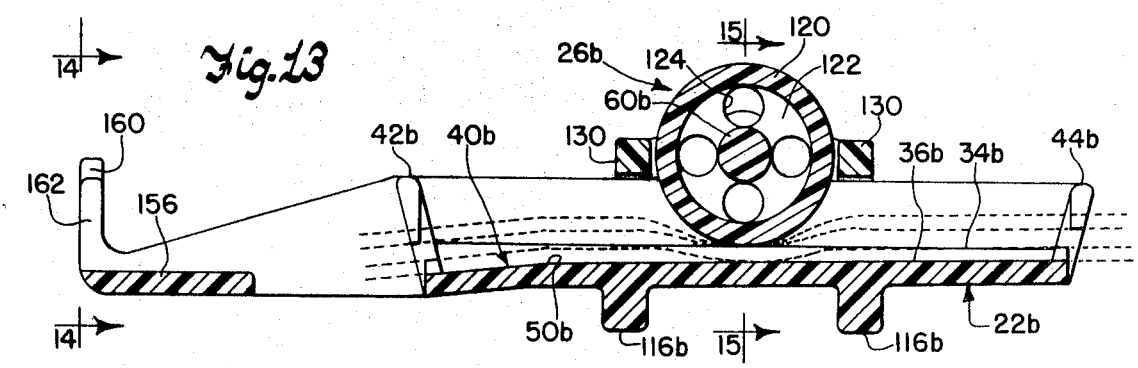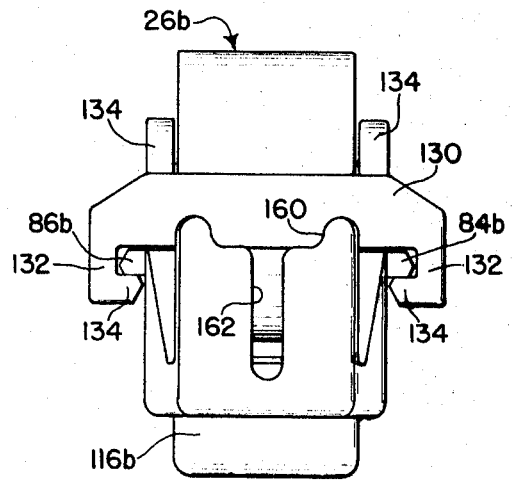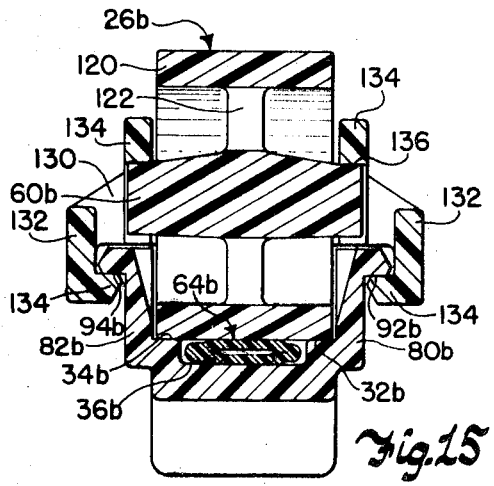

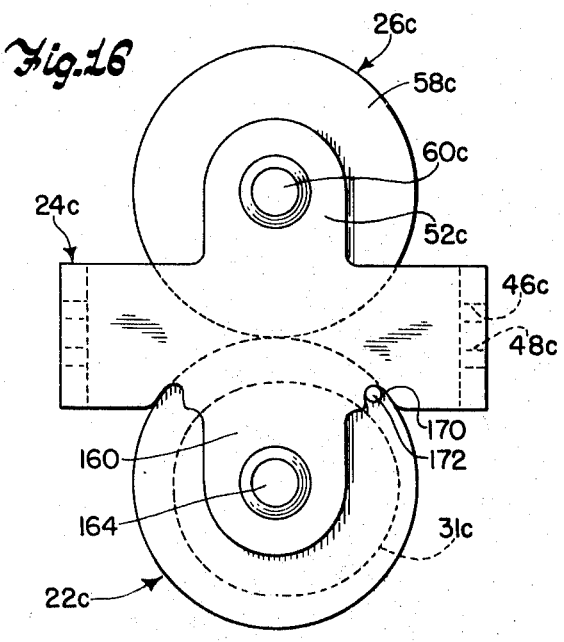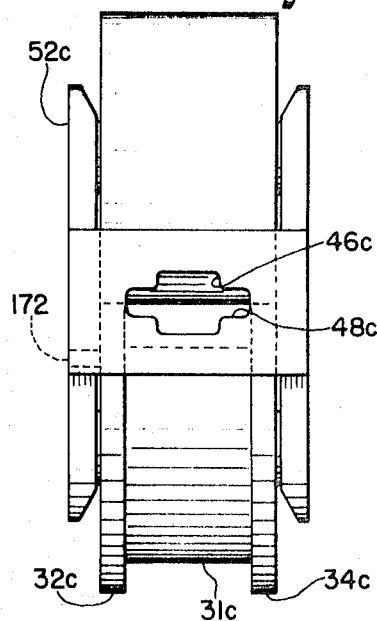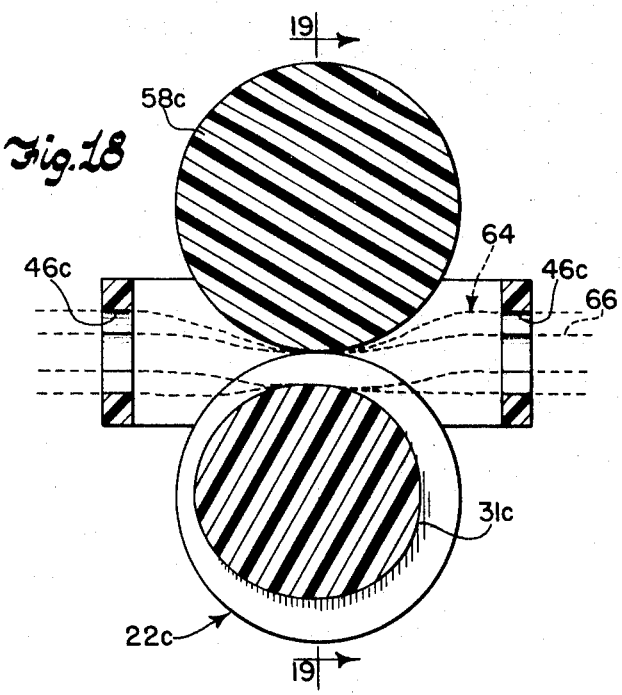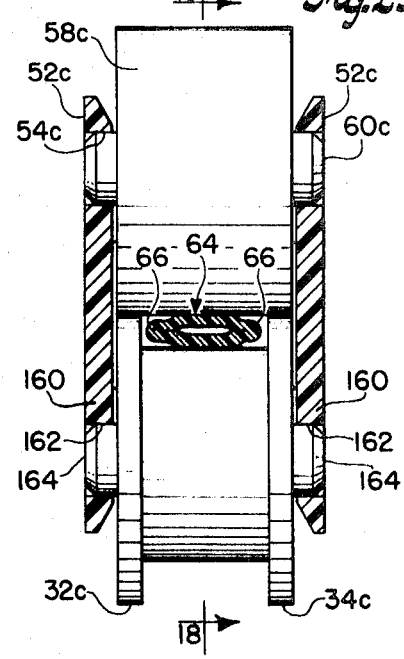
INVENTOR.
Frank J. Rychlik

ROLLER CLAMP FOR FLEXIBLE TUBING

BACKGROUND OF THE INVENTION

In the field of hospital and medical equipment it has been found that due to the labor cost factor it is cheaper to use a device only once and discard it rather than to resterilize and repackage the device for additional use. Hence, to reduce initial costs of such equipment it has become quite common to seek lower price materials which can be sterilized, afford an improved aesthetic appearance and which will function in the desired fashion. Certain injection molded and/or extruded plastic materials have been widely utilized as generally inexpensive materials having these properties.

Experience in the use of these materials has revealed that many plastic materials will, under stress as well as normal conditions, relax or "cold flow." Thus, plastic clamps and their associated plastic tubing have been known to cold flow when set for an adjusted rate of fluid flow. In particular, the clamps relax under stress and relieve the pressure they exert on the tubing thereby changing the setting and rate of fluid flow. Similarly, the tubing, which is normally circular in section, will develop teardrop-shaped openings at opposite edge extremities of the bore of a newly compressed tube due to the high tensile forces set up in compressing the tubing into a tight radius of curvature along opposite edges. After a period of time the tubing will cold flow or relax and close up the openings thereby eliminating or seriously reducing fluid flow through the tubing.

SUMMARY

The invention relates to a variable clamp means for flexible tubing, said clamp including a rigid reference surface, a channel which slopes relative to said reference surface and a rigid roller maintained in pressure contact with said reference surface and movable relative to said channel and adapted to variably compress the tubing within said channel to control the fluid flow through said tubing. The rigid roller body rides in pressure contact on the rigid reference surface and substantially insures an absence of cold flow in the clamp per se. It is recommended that such a clamp be utilized with an oriented preformed tubing in which opposite sides of an axial portion of the initially circular tubing is crimped and sealed to eliminate the teardrop cold flow susceptible openings when squeezed by a clamp. Such a tubing is set forth in more detail hereinafter as well as in copending application for U.S. Letters Pat. Ser. No. 861,967, filed Sept. 29, 1969.

An object of the invention is to provide a clamp for flexible tubing which is virtually free of cold-flow problems and will maintain a predetermined setting until further adjustment by an operator.

A further object is to combine such a clamp with a precrimped tubing which is oriented within the clamp to eliminate cold flow of the tubing.

Still another object of this invention is to provide an economical clamp which can be readily fabricated and will carry out the other objects of this invention.

DRAWING

FIG. 1 is a perspective view of a roller clamp embodying the teachings of the present invention;

FIG. 2 is a sectional elevational view of the device shown in FIG. 1 with a tubing of the type contemplated to be used therewith being shown in phantom;

FIG. 3 is an elevational view in partial section taken along lines 3—3 of FIG. 2;

FIG. 4 is an end view taken along line 4—4 of FIG. 2;

FIG. 5 is a schematic diagram showing the forces involved in practicing the teachings of the present invention;

FIG. 6 is a cross-sectional view of a crimped tubing of the type contemplated to be used with the present invention;

FIG. 7 is a perspective view in partial section of a second embodiment utilizing the teachings of the present invention;

P FIG. 8 is an elevational view in partial section of the device shown in FIG. 7;

FIG. 9 is an elevational view in partial section taken along line 9—9 of FIG. 8S FIG. 10 is an end view taken along line 10—10 of FIG. 8;

FIG. 11 is a partial plan view of the device shown in FIG. 8;

FIG. 12 is a perspective view of the third embodiment of the present invention;

FIG. 13 is an elevational view in partial section of the device shown in FIG. 12;

FIG. 14 is an end view taken along line 14—14 of FIG. 13;

FIG. 15 is an elevational view in partial section taken along line 15—15 of FIG. 13;

FIG. 16 is an elevational view of still another embodiment of the present invention;

FIG. 17 is an end view of the device shown in FIG. 16;

FIG. 18 is an elevational view in partial section taken along line 18—18 of FIG. 19; and FIG. 18 is an elevational view in partial section taken along line 19—19 of FIG. 18.

DESCRIPTION

Referring now to the drawing wherein similar parts are designated by similar numerals, the clamp 20 shown in FIG. 1 includes a body 22, a yoke 24 and a roller 26.

The body 22 is a substantially rectangular casinglike member having a pair of spaced elongated side rails or walls 28, 30 having their upper surfaces 32, 34 respectively disposed in a common plane to provide a reference surface. The portion of the body 22 intermediate the side rails and substantially coextensive therewith is sloped relative to the surfaces 32, 34 and forms a channel 40 defined by the walls 28, 30 and the base 36. Opposite ends of the body are provided with apertured upstanding wall portions 42 44. Each of the walls terminates an end of the channel and is provided with an aperture formed by a vertically extending slot portion 46 opening through the upper edge of the wall and laterally extending slots 48 communicating with the vertical slot 46. The base of the slot 46 preferably, although not necessarily, is coterminus with the base 36 adjacent the particular wall in question. As can be seen in FIG. 2 the base 36 has a varying depth relative to the reference surfaces and hence in this embodiment does not have a constant slope relative to said reference surface, but rather, it has a steep slope adjacent wall 42 and a more gentle or flattened slope adjacent wall 44. The variation shown in the slope is a straight line angular one with a change or rate of slope taking place at the point 50, for purposes best set forth hereinafter. In this embodiment the external surfaces of wall 28, 30 and the under surface 31 of the body 22 are preferably smooth and unobstructed.

The yoke 24 is generally U-shaped shaped and includes a base 50 and a pair of upstanding arms 52. Adjacent the upper extremity of each of the arms is an aperture 54 adapted to complementarily accept a hub 60 of the roller 26. The inner upper extremity of the arms 52 and the hubs 60 each have a chamfer 56 or a radius to assist in spreading the arms 52 as the hubs 60 are assembled with the bearing apertures 54. The roller 26 includes a cylindrical rigid body portion 58 and a pair of oppositely extending hubs 60, although a pass-through axle would be equally satisfactory. The rigid roller body 58 has an axial extent sufficient to extend between and rest A—the reference surfaces 32, 34, and preferably is coextensive with the lateral width of the body 22. The hubs 60 in this embodiment are positioned a predetermined distance above the plane of the reference surface when the roller body contacts the reference surfaces. The apertures 54, when the in rigid 50 of the yoke reference in engagement the rigid the under surfaces 31 of the body, are positioned slightly be subjected than the predetermined distance of the hubs, whereby, the hubs, when engaged by the yoke, are placed under a slight stress by tubing yoke 24 pulling downwardly on the hubs, 6, namely, crimped opposite riblike portions 66 to eliminate cold flow in the bore 68 and central curved portions 70, can be placed this instance defined by the upper surfaces 32, 34 of the side rails.

As can best be seen in FIG. 5 it is a basic premise of this invention to insure the constant contact of the rigid roller 26 with the reference plane as defined by the arrows A—A in FIG. 5 with the pressure being applied by suitable means, in this embodiment by the yoke 24 in the direction of the arrow B, in FIG. 5. The channel base 36 provides a secondary reference relative to the reference surface and it too is in rigid relationship to the refenrce surface reference the rigid roller. Thus, any device in position in said channel will be subjected to a varying degree of compressive action by the roller as it moves along the reference surface 34. For example, a tubing 64, having the configuration shown in FIG. 6, namely, crimped opposite riblike portions 66 to eliminate cold flow in the bore 68 and central curved portions 70, can be placed in the position shown in FIG. 2 in phantom for purposes of clarity and illustration of the basic clamp. The ribs 66 are oriented within the slots 48 while the curved portions 70 rest within the upper and lower portions of vertical slot 46. The tubing can generally best be inserted by laying the tubing within the confines of the slots and the body prior to assembly of the roller and yoke with the body. Another method is to thread the tubing through the slots when the roller 26 and the yoke 24 are positioned at the point where the channel 40 has its greatest depth, namely at the left-hand end of the clamp as viewed in the drawing. A motion of the roller 26 to the right in the drawing will result in an increased crimping or squeezing of the tubing 64.

As was previously indicated channel 40 initially has a steep slope up to the point 50 and then a shallower straight line, or if preferred varying slope in the direction of the wall 44. The steep slope serves a double purpose namely it provides a point that gives ease in assembly of the tubing to the clamp if it is fed axially between the rollers 26 and the channel 40 and additionally when the roller is thus moved to the right to the compressive position, the steeper slope permits a rapid adjustment of the tubing 64. As the curved portions 70 are compressed between the roller 26 and the base surface 36 there is a tendency for tubing to expand laterally with the ribs 66 moving laterally within the slots 48. When the roller reaches the position shown in FIG. 3 the tube has assumed a linear form with the bore 68 being in a generally rectangular configuration with a minimal tapered end adjacent the sealed ribs 66. It has been found that at a point adjacent wall 44 the depth of base surface 36 relative to the reference surface 34 should be approximately equal to or less than twice the wall thickness of the tubing 64, to insure substantial cutoff of all fluid flow by total closure of the bore 68. Thus, it is possible with this device for an operator to apply thumb pressure to the wheel 26 and to move it along the reference plane defined by the upper references 32, 34 and thereby compress the tubing 64 to the desired rate.

The pressure maintained on the roller 26 insures intimate contact with the reference surfaces 32, 34 and additionally will provide sufficient friction to insure its maintenance in a chosen position along the axis of the body 22. It has been found that a combination of tubing 64 with a roller clamp 24 of this configuration will maintain consistent drip-rate settings over extended periods of time while known devices of the prior art, as previously described, have varied as much as 80 percent or more within as short a check period as 5 minutes or less. The rigid roller and reference surfaces defined by the rails 32, 34 and the rigid sloping base surface 36 substantially eliminate cold flow or relaxation in the clamp 20 while the precrimped tubing 64 insures the elimination of cold flow in the tubing. As a practical matter, the tubing can be circular throughout the balance of its extent and preferably the crimping, forming the rib 66 by sealing the inner surfaces of the bore 68, need not have an axial extent much in excess of the distance between the end walls 42, 44 and the orienting slots 46, 48. It should be recognized, however, that this clamp can be used with a normal round or oval tubing.

Referring now to FIG. 7 through 11 where similar numerals will be used to designate similar parts with the addition of the suffix "a." The body 22a includes reference surfaces 32a, 34a; sloping base surfaces 36a; and end walls 42a, 44a with their appropriate apertures formed by slots 46a and 48a. In this embodiment the roller 26a does not have a hub 60 but rather is substantially a rigid reinforced cylindrical body 58a. The body 22a in this embodiment includes walls 80, 82 extending upwardly from the outer edge of the reference surfaces 32a 34a and each terminating at their free extremity with a flange 84 and 86 respectively, which extends laterally outwardly away from the interior of the body. Flanges 84, 86 have chamfers 88, 90 respectively and a downwardly spacing shoulder 92 and 94, respectively.

A planar member or cover 100 is provided in this embodiment which is substantially coextensive with the length of the body 22a. The cover 100 includes a pair of side rails 102 having depending means 104 which terminate in inwardly directed flange means 106 forming a should for underlying and engaging shoulders 92, 94 carried by the walls 80, 82. Intermediate the side rails 102 is a central substantially planar portion 108 which is slightly resilient and is supported by two or more inwardly directed members 110. AT under edge of ends of the cover 100 end rails 112 space the side rails 102 and cooperate with the members 110 in supporting the central planar portion 108. The cover 100 can be applied to the body portion either by moving the device axially to bring the planar portion 108 into sliding contact with flanges 84, 86 and so that shoulders 106 will underly and slidingly engage the shoulders 92, 94 or it may be transversely applied by moving downwardly, as viewed in the drawings, so that the flange means 104 will bend laterally, guided by the chambers 88, 90 and a chamfered under edge of the flange 106 until such time as the flange 106 will snap inwardly and underly the shoulders 92, 94. Referring now to FIG. 9, where the dimensional relationship is exaggerated for illustration purposes only, the solid cylinder body 58a has a diameter slightly in excess of the dimension from reference surface 32a, 34a to the upper extremity of flanges 84, 86. The connecting members 110 and the central planar portion 108 of the cover 100 are sufficiently resilient whereby the cover 100 will flex upwardly to accommodate the oversize cylindrical roller body 58a. Thus, the cover 100 with its resilient portions acts as a resilient pressure means to insure positive engagement between the rigid roller 58a and the reference surface defined by the upper surfaces 32a, 34a. This engagement, when taken in combination with the channel 40a and its lower surface 36a, defines a position noncold-flow arrangement capable of maintaining a positive correlation of the compressive relationship at any position of the roller relative to the reference surface.

In this embodiment the upper surface of planar member 108 can be provided with transverse ribs 114 and the body 22a with downwardly depending lugs 116 which permit an operator to have a nonslipping engagement with the roller clamp by interposition of digits between and/or adjacent to lugs 116 while the thumb surface will be nonskid relative to the ribs 114. The relationship of the roller and the tubing as seen in phantom in FIG. 8 and in section in FIG. 9 is substantially identical to the first embodiment. It will be appreciated that the depending flange 104 from the side rails 102 can be coextensive throughout the length of the side rail 102 or can be intermittent depending upon the design characteristics of the material being utilized. It will be apparent to those familiar with plastics that it is possible, through the use of discreet sections and relief and by the openings 118 caused by the intermittent placement of the members 110 relative to the side rails 102 that it is possible to have a single unit, as for example cover 100, molded of the same material and be both semiresilient and rigid in a single injection molding operation.

A third embodiment to the present invention can be seen in FIGS. 12 through 15 wherein similar parts will be designated by similar numerals with the addition of the suffix "b." The body 22b is provided with a pair of spaced internal reference surfaces 32b, 34b, a sloping base surface 36b forming the channel 40b; and end walls 42b, 44b with their associated slots 46b, 48b for orientation of the tubing. The body portion 22b additionally has upstanding walls 80b and 82b positioned laterally and extending above the reference surfaces 32b, 34b, and terminating in downwardly facing lateral flange means 92b and 94b. Gripping lugs 116b can also be provided on the base of the body.

In this embodiment the roller 26b includes a rigid rim 120 supported on a hub or axle 60b by a web 122 which may be relieved for material savings by means of apertures 124.

The yoke 24b in this embodiment differs from the first embodiment in that it does not underlie the body but rather assumes the attitude taken in the second embodiment of overlying the body and engaging with the laterally extending flanges 24b and 86b at the upper extremities of the walls 80b and 82b. The yoke 24b includes a pair of transverse rigid members 130 which rest on top of the flanges 84b and 86b and are joined by longitudinally extending side rails 132 having inwardly directed flanges 134 adapted to underlie and slidingly engage the shoulders 92b and 94b which extend laterally from the walls of the body. Intermediate the side rails 132 are a pair of bearing bars 134 each having a slot opening downwardly through its lower edge toward the channel with the closed upper extremity of the slot being semicircular to form a bearing to ride upon and cooperate with the free ends of the hub 60b. The slot 136 diverges or becomes wider as it extends away from the semicircular upper termination. The distance from the upper surface of hub 60b to the reference surfaces 32b, 34b, when the roller is in contact with said surfaces, is equal to or greater than the distance from the opposing surface of slot 136 and the reference planar surfaces. Thus, the hub 60b is placed under a strain or is slightly distorted downwardly at its extremities by the yoke and hence is maintained in a constant pressure relationship with the plane of the reference surfaces 32b, 34b. The yoke member being substantially rigid in cooperation with the rigid walls and the cantilever effect of the hub 60b results in this resilient pressure retaining arrangement, however, the rigid characteristics of the wheel 120, the reference planar surfaces 32b and 34b and the base surface 36b are adapted to cooperate totally in a non-cold-flow situation to compress and control the fluid flow through the tubing 64b.

In many instances it is desirable to totally halt the passage of fluids for a temporary period of time and then to resume the flow at the same rate. In this embodiment an extension 150 is provided on the body 22b in the form of a pair of side rails 152 and an end wall 154 suitably supported by a cross brace 156 between the side rails. The end wall 154 is notched, as at 160, at its upper extremity and is centrally provided with a rigid slot 162. In the event that it is desired to terminate the flow of fluids through the tube, the tube as it emanates from the end wall 42b is twisted along its axis approximately 90° and is squeezed between the opposed walls of slot 162. This permits the operator to retain the roller 26b in the same location while totally ceasing the flow of fluids by squeezing the tube in the slot 162. When slot 162 is not being utilized, the tubing can rest in an oriented fashion within the notch 160. It will be recognized that a similar stop-slot arrangement can be made to all of the embodiments of the invention and is included with this embodiment solely for the purpose of illustration. Similarly, it is interesting to note that the end wall 42b and 44b have tapered internal surfaces, as viewed in FIGS. 8 and 13 whereby a two-plate mold can be utilized to form the slots forming the apertures in said end walls 42b and 44b.

Another embodiment to the present invention can be seen in FIGS. 16 through 19 wherein similar parts will be designated with similar numerals with the addition of the suffix "C." In this embodiment the roller 26c has a substantially rigid cylindrical body 58c and a pair of laterally extending hubs 60c. In this embodiment the body 22c is circular rather than planar and has a pair of circular reference surfaces 32c, 34c and an intermediate cam surface 31c eccentrically disposed relative to the reference surfaces. Yoke 24c is a substantially rectangular open-ended box having a pair of arms 52c extending from one end having apertures 54c forming a bearing surface for the hubs 60c. Opposite ends of the yoke are provided with apertures having vertical slots 46c and lateral extending keyhole slots 48c for use in orienting the ribs 66 of the tubing 64.

Extending in the opposite direction from the arms 52c are a second pair of arms 160, each having an aperture 162 which is complemental to and adapted to accept a hub 164 extending laterally from the cylindrical body 22c having reference surfaces 32c, 34c. The apertures 54c and 162 are spaced so as to maintain the rigid cylindrical roller body 58c and the reference surfaces 32c, 34c in constant pressure engagement. In FIG. 16 it can be seen that the yoke is slightly relieved adjacent the juncture of arm 160 and the main body portion of the yoke 24c as at 170. The relief 170 essentially acts as a recessed stop to accept a pin 172 extending laterally from the cylindrical body 22c and contacts the recess 170 to serve as a stop for elimination of overrotation of the reference surface. It also assists in orientation of the body for insertion of a tube through the apertured end walls, thence through the opening formed by the cam channel surface and the reference rigid roller 58c. The operation of this device is essentially similar to that of the planar members except that there is the use of two rotary members rather than a single rotary member and a planar surface.

Thus, in all of the roller clamps proposed, the cylindrical body portion of the roller is substantially rigid and is maintained in a positive pressure contact with a substantially rigid reference surface. In the first three embodiments the reference surface is a pair of planar members falling on a common plane while, in the last embodiment described, there is provided a circular or cylindrical member having two disclike reference surfaces on either side of a variable cam surface, the latter cam being the equivalent of the sloped channel found in the first three embodiments. In all of these devices the rigidity of the materials is so designed as to substantially eliminate the problem of relaxation or cold flow. Additionally, they employ means for orienting a specific configuration of tubing which will assist in the prevention of cold flow, when the clamp is combined with the tubing. It should be recognized, however, that these clamps can be used with standard cylindrical tubing even though the precrimped tubing is more desirable.

While the teachings of the present invention have been adequately illustrated by four embodiments, it will be apparent to those skilled in the art that modifications can be made which will come within the purvue of the present invention as claimed.

I claim:

1. A variable clamp device adapted to accept elongated resilient tubing including a casinglike body through which the tubing is passed, a roller having a substantially cylindrical rigid main body portion defining the largest diametral portion of said roller, means providing a rigid reference surface against which the main body portion of said roller is movably positioned, said reference surface including a pair of spaced rigid elongated side rails along said body having their upper surfaces disposed in a common plane, rigid channel means in said body and having a varying depth relative to said side rails being disposed intermediate said side rails and substantially coextensive therewith, said main body portion of said roller extending between and resting in intimate contact with said upper surfaces of said spaced side rails, and shiftably means trapped for sliding movement along the body with movement of the roller and including resilient means exerting a positive pressure on said roller substantially perpendicular to said upper surfaces of said side rails to maintain said main body portion in intimate engagement with said spaced side rails whereby said main body portion when moved along said side rails defines a varying opening between said rigid channel means and the undersurface of said main body portion for clamping a resilient tube disposed therebetween.

2. A device of the type claimed in claim 1 wherein said roller body portion includes an axially extending hub at opposite ends of smaller diameter than said main body portion, said resilient means engaging said hubs and acting in combination with said hubs to maintain said roller in resilient pressure engagement with said rails.

3. A device of the type claimed in claim 2 wherein said shiftable means includes a U-shaped member adapted to embrace said body and to have the arms of the U extend upwardly above the common plane of said upper surfaces, aperture means in said arms adapted to accept said hubs, said hubs being spaced from said common plane a predetermined distance when said roller is in engagement with said rails, said aperture means in said arms being spaced above said common planes a distance less than said predetermined distance of said hubs whereby said hubs are stressed downwardly in resilient engagement with said aperture means to thereby force said roller body portion into intimate engagement with said side rails.

4. A device of the type claimed in claim 2 wherein said body includes orienting means adapted to cooperate with said tubing to orient said tubing relative to said channel means.

5. A device of the type claimed in claim 2 wherein said body includes a pair of sidewalls extending upwardly from said side rails and having retaining means adjacent the upper free edge extending substantially the length of the body, and said shiftable means includes slideable block means adapted to engage said retaining means and to be moveable along the hub edge of said sidewalls, said block means having means to accept the hub means of said roller and to maintain said roller body portion in intimate engagement with said reference plane on the side rails.

6. A device of the type claimed in claim 5 wherein said retaining means includes an outwardly extending flange along the upper free edge of each sidewall, said block including a downwardly depending flange terminating in an inwardly extending flange for underlying the retaining flange and having means located a lesser distance from said common plane than the diametral distance of said hub from said plane said means being resilient to thereby intimately force said roller into engagement with said side rails.

7. A device of the type claimed in claim 5 wherein at least one end of said body is provided with transversely extending wall having a tube orienting aperture therein, said apertured wall extending between said sidewalls to orient said tubing in a specific relation to said channel.

8. A device of the type claimed in claim 5 wherein at least one end of said body is provided with an extension adapted to accept in crimped relation a portion of the tubing for a complete cessation of flow through said tubing by virtue of the crimping of the tube by said means.

9. A device of the type claimed in claim 1 wherein said body further includes a pair of sidewalls extending upwardly beyond the common plane of said side rails and integral therewith, engaging means disposed adjacent the upper extremity of said sidewalls, and said shiftable means includes a moveable substantially planar member having means to cooperate with said engaging means for maintaining said planar member in a substantially parallel spaced relation to said common plane and yet permitting movement of said planar member axially relative to said body whereby said planar member will contact said roller diametrically opposite the point of contact with said common reference plane and movement of said planar member will cause said roller to move along said side rails in intimate engagement therewith.

10. A device of the type intermediate in claim 9 wherein said planar member is relieved intermediate its margins to provide an elongated central portion which is resiliently mounted relative to the attaching means and said body, said planar member being spaced from said common plane of the side rails a distance less than the diameter of said roller, said planar member being resilient and adapted to be moved away from said common plane at the point of engagement with said roller whereby said roller is maintained in resilient intimate contact with said side rails.

11. A device of the type claimed in claim 10 wherein said body on the side opposite said side rails and exposed portion of said planar member are provided with engaging means to assist in the manipulation of said planar member.

12. A device of the type claimed in claim 9 wherein said body includes at least one transverse apertured wall extending between said sidewalls, said aperture being positioned adjacent said channel means and having a specific configuration adapted to accept in oriented relation resilient tubular member having a complementary configuration to thereby orient said tubular member relative to said clamp, channel and roller.

* * * * *